US012131035B1

(12) United States Patent
Lee et al.

(10) Patent No.: US 12,131,035 B1
(45) Date of Patent: Oct. 29, 2024

(54) METHOD AND APPARATUS FOR PERFORMING DATA ACCESS MANAGEMENT OF MEMORY DEVICE IN PREDETERMINED COMMUNICATIONS ARCHITECTURE TO ENHANCE SUDDEN POWER OFF RECOVERY OF PAGE-GROUP-BASED REDUNDANT ARRAY OF INDEPENDENT DISKS PROTECTION WITH AID OF MULTI-TABLE CONTROL USING DUMMY FLAG

(71) Applicant: Silicon Motion, Inc., Hsinchu County (TW)

(72) Inventors: Jie-Hao Lee, Hsinchu County (TW); Ting-Fong Hsu, Taoyuan (TW); Szu-I Yeh, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 18/202,304

(22) Filed: May 26, 2023

(51) Int. Cl.
*G06F 3/06* (2006.01)
*G06F 12/1009* (2016.01)

(52) U.S. Cl.
CPC ............ *G06F 3/0619* (2013.01); *G06F 3/064* (2013.01); *G06F 3/0689* (2013.01); *G06F 12/1009* (2013.01)

(58) Field of Classification Search
CPC ...... G06F 3/0619; G06F 3/064; G06F 3/0689; G06F 12/1009
USPC ................................................. 711/154, 100
See application file for complete search history.

(56) References Cited

U.S. PATENT DOCUMENTS

2021/0334157 A1* 10/2021 Kannan ................. G06F 3/0619

* cited by examiner

*Primary Examiner* — Masud K Khan
*Assistant Examiner* — Zubair Ahmed
(74) *Attorney, Agent, or Firm* — Winston Hsu

(57) ABSTRACT

A method for performing data access management of a memory device in predetermined communications architecture to enhance sudden power off recovery (SPOR) of page-group-based redundant array of independent disks (RAID) protection with aid of multi-table control using dummy flag and associated apparatus are provided. The method may include: after occurrence of a sudden power off (SPO) event, utilizing the memory controller to perform a SPOR procedure in response to the SPO event, for example, updating a temporary physical-to-logical (P2L) address mapping table corresponding to a first active block to carry the dummy flag in each P2L table entry of at least one P2L table entry corresponding to at least one set of damaged pages; and after performing the SPOR procedure in response to the SPO event, utilizing the memory controller to write subsequent data into at least one set of subsequent pages in the damaged page group.

16 Claims, 8 Drawing Sheets

METHOD AND APPARATUS FOR PERFORMING DATA ACCESS MANAGEMENT OF MEMORY DEVICE IN PREDETERMINED COMMUNICATIONS ARCHITECTURE TO ENHANCE SUDDEN POWER OFF RECOVERY OF PAGE-GROUP-BASED REDUNDANT ARRAY OF INDEPENDENT DISKS PROTECTION WITH AID OF MULTI-TABLE CONTROL USING DUMMY FLAG

BACKGROUND OF THE INVENTION

1. Field of the Invention

The present invention is related to memory control, and more particularly, to a method and apparatus for performing data access management of a memory device in a predetermined communications architecture to enhance sudden power off recovery (SPOR) of page-group-based redundant array of independent disks (RAID) protection with aid of multi-table control using a dummy flag.

2. Description of the Prior Art

A memory device may comprise Flash memory for storing data, and the management of accessing the Flash memory is complicated. For example, the memory device may be a memory card, a solid state drive (SSD), or an embedded storage device such as that conforming to Universal Flash Storage (UFS) specification. The memory device may be arranged to store various files such as system files, user files, etc. in a file system of a host. As some files may be frequently accessed, some data may become invalid data, and it may be needed to release more storage space for further use. During accessing of the files, internal management information may change correspondingly. There may be multiple types of internal management information. When a sudden power off SPO event occurs, associated processing may be time consuming. For example, in a situation where the memory device is equipped with a certain type of RAID protection mechanism, the total processing time may be increased. It seems that there is no proper suggestion in the related art. Thus, a novel method and associated architecture are needed for solving the problems without introducing any side effect or in a way that is less likely to introduce a side effect.

SUMMARY OF THE INVENTION

It is therefore an objective of the present invention to provide a method and apparatus for performing data access management of a memory device in a predetermined communications architecture (e.g., a UFS communications architecture) to enhance SPOR of page-group-based RAID protection with aid of multi-table control using a dummy flag, in order to solve the above-mentioned problems.

At least one embodiment of the present invention provides a method for performing data access management of a memory device in a predetermined communications architecture to enhance SPOR of page-group-based RAID protection with aid of multi-table control using a dummy flag, where the method can be applied to a memory controller of the memory device. The memory device may comprise the memory controller and a non-volatile (NV) memory, the NV memory may comprise at least one NV memory element (e.g., one or more NV memory elements), and the at least one NV memory element may comprise a plurality of blocks. The method may comprise: after occurrence of a SPO event, utilizing the memory controller to perform a SPOR procedure in response to the SPO event; and after performing the SPOR procedure in response to the SPO event, utilizing the memory controller to write subsequent data into at least one set of subsequent pages in the damaged page group. For example, the SPOR procedure may comprise: determining a beginning location of a damaged page group; updating a temporary physical-to-logical (P2L) address mapping table corresponding to a first active block to carry the dummy flag in each P2L table entry of at least one P2L table entry corresponding to at least one set of damaged pages, for indicating that RAID encoding of the at least one set of damaged pages in the damaged page group should be skipped; writing at least one set of dummy pages into the first active block; and updating the temporary P2L address mapping table to carry the dummy flag in each P2L table entry of at least one P2L table entry corresponding to the at least one set of dummy pages, for indicating that RAID encoding of the at least one set of dummy pages in the damaged page group should be skipped.

In addition to the above method, the present invention also provides a memory controller of a memory device, where the memory device comprises the memory controller and an NV memory. The NV memory may comprise at least one NV memory element (e.g., one or more NV memory elements), and the at least one NV memory element may comprise a plurality of blocks. In addition, the memory controller comprises a processing circuit that is arranged to control the memory controller according to a plurality of host commands from a host device, to allow the host device to access the NV memory through the memory controller, wherein the processing circuit is arranged to perform data access management of the memory device in a predetermined communications architecture to enhance SPOR of page-group-based RAID protection with aid of multi-table control using a dummy flag. For example, after occurrence of a SPO event, the memory controller performs a SPOR procedure in response to the SPO event; and after performing the SPOR procedure in response to the SPO event, the memory controller writes subsequent data into at least one set of subsequent pages in the damaged page group. The SPOR procedure may comprise: determining a beginning location of a damaged page group; updating a temporary physical-to-logical (P2L) address mapping table corresponding to a first active block to carry the dummy flag in each P2L table entry of at least one P2L table entry corresponding to at least one set of damaged pages, for indicating that RAID encoding of the at least one set of damaged pages in the damaged page group should be skipped; writing at least one set of dummy pages into the first active block; and updating the temporary P2L address mapping table to carry the dummy flag in each P2L table entry of at least one P2L table entry corresponding to the at least one set of dummy pages, for indicating that RAID encoding of the at least one set of dummy pages in the damaged page group should be skipped.

In addition to the method mentioned above, the present invention also provides the memory device comprising the memory controller mentioned above, wherein the memory device comprises: the NV memory, configured to store information; and the memory controller, coupled to the NV memory, configured to control operations of the memory device.

In addition to the method mentioned above, the present invention also provides an electronic device comprising the memory device mentioned above, wherein the electronic device further comprises the host device that is coupled to the memory device. The host device may comprise: at least one processor, arranged for controlling operations of the host device; and a power supply circuit, coupled to the at least one processor, arranged for providing power to the at least one processor and the memory device. In addition, the memory device provides the host device with storage space.

According to some embodiments, the apparatus may comprise at least one portion (e.g., a portion or all) of the electronic device. For example, the apparatus may comprise the memory controller within the memory device. In another example, the apparatus may comprise the memory device. In yet another example, the apparatus may comprise the electronic device.

According to some embodiments, the memory device may store data for the host device, where updating some data among the stored data may be needed. In order to correct the related art problems, it is suggested that the memory device may operate according to at least one control scheme (e.g., one or more control schemes) of the method to perform associated operations, and more particularly, execute multiple procedures of the method to perform multi-table control using the dummy flag, to enhance overall performance.

The present invention method and apparatus can guarantee that the memory device can operate properly in various situations. For example, the memory controller may perform the SPOR procedure in response to the SPO event, in order to record the dummy flag for indicating that RAID encoding of the damaged pages and dummy pages should be skipped, and refer to the dummy flag generated in the SPOR procedure to perform other procedures such as a table update procedure and a RAID decoding procedure, to guarantee correctness of the data, decrease the total processing time of associated processing and enhance overall performance. In addition, the present invention method and apparatus can solve the related art problems without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
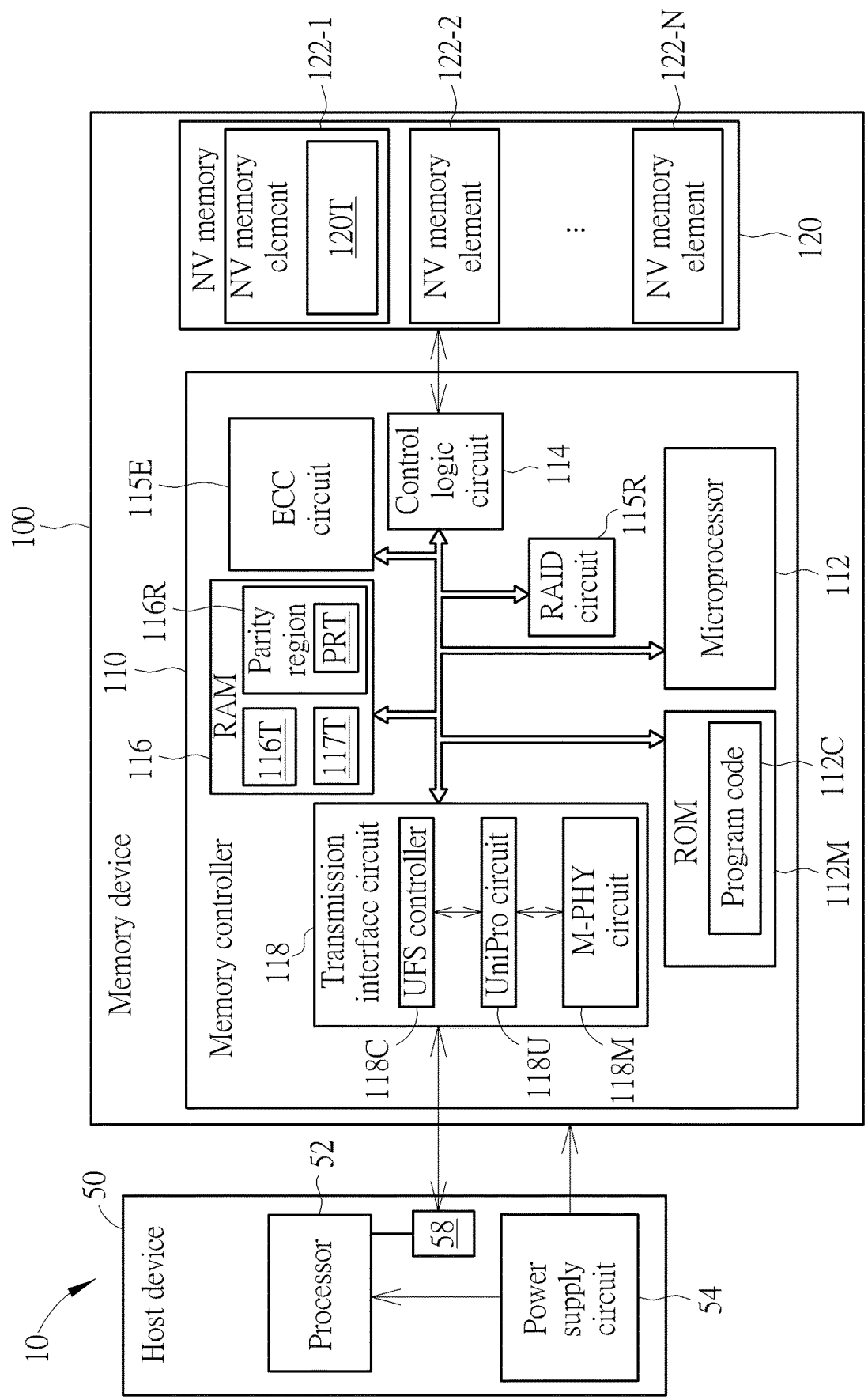
FIG. 1 is a diagram of an electronic device according to an embodiment of the present invention.

FIG. 1 is a diagram of an electronic device 10 according to an embodiment of the present invention, where the electronic device 10 may comprise a host device 50 and a memory device 100. The host device 50 may comprise at least one processor (e.g., one or more processors) which may be collectively referred to as the processor 52, a power supply circuit 54, and a transmission interface circuit 58, where the processor 52 and the transmission interface circuit 58 may be coupled to each other through a bus, and may be coupled to the power supply circuit 54 to obtain power. The processor 52 may be arranged to control operations of the host device 50, and the power supply circuit 54 may be arranged to provide the processor 52, the transmission interface circuit 58, and the memory device 100 with power, and output one or more driving voltages to the memory device 100, where the memory device 100 may provide the host device 50 with storage space, and may obtain the one or more driving voltages from the host device 50, to be the power of the memory device 100. Examples of the host device 50 may include, but are not limited to: a multifunctional mobile phone, a tablet computer, a wearable device, and a personal computer such as a desktop computer and a laptop computer. Examples of the memory device 100 may include, but are not limited to: a portable memory device (e.g., a memory card conforming to the SD/MMC, CF, MS or XD specification), a solid state drive (SSD), and various types of embedded memory devices (e.g., an embedded memory device conforming to the UFS or eMMC specification). According to this embodiment, the memory device 100 may comprise a controller such as a memory controller 110, and may further comprise a non-volatile (NV) memory 120, where the controller is arranged to access the NV memory 120, and the NV memory 120 is arranged to store information. The NV memory 120 may comprise at least one NV memory element (e.g., one or more NV memory elements), such as a plurality of NV memory elements 122-1, 122-2, ..., and 122-N, where "N" may represent a positive integer that is greater than one. For example, the NV memory 120 may be a flash memory, and the plurality of NV memory elements 122-1, 122-2, ..., and 122-N may be a plurality of flash memory chips or a plurality of flash memory dies, respectively, but the present invention is not limited thereto.

As shown in FIG. 1, the memory controller 110 may comprise a processing circuit such as a microprocessor 112, a storage unit such as a read only memory (ROM) 112M, a control logic circuit 114, an error correction code (ECC) circuit 115E, a RAID circuit 115R, a Random Access Memory (RAM) 116, and a transmission interface circuit 118, where at least one portion (e.g., a portion or all) of the above components may be coupled to one another via a bus. The RAM 116 may be arranged to provide the memory controller 110 with internal storage space (for example, may temporarily store information), where the RAM 116 may be implemented by way of Static Random Access Memory (SRAM), but the present invention is not limited thereto. In addition, the ROM 112M of this embodiment is arranged to store a program code 112C, and the microprocessor 112 is arranged to execute the program code 112C to control the access of the NV memory 120. Please note that, the program code 112C may also be stored in the RAM 116 or any type of memory. Additionally, the control logic circuit 114 may be arranged to control the NV memory 120. The ECC circuit 115E may perform ECC encoding and ECC decoding, in order to protect data and/or perform error correction for any sub-storage-unit of multiple sub-storage-units within a physical page, and the size of each of the multiple sub-storage-units may be equal to a predetermined size. The RAID circuit 115R may perform RAID encoding and RAID decoding, in order to protect data and/or perform error correction for a physical page group. The transmission interface circuit 118 may comprise multiple sub-circuits, which may interact with each other to perform communications. The transmission interface circuit 118 may conform to one or more communications specifications among various communications specifications (e.g., the Serial Advanced Technology Attachment (SATA) specification, Universal Serial Bus (USB) specification, Peripheral Component Interconnect Express (PCIe) specification, embedded Multi Media Card (eMMC) specification, and Universal Flash Storage (UFS) specification), and may perform communications with the host device 50 (e.g., the transmission interface circuit 58) according to the one or more communications specifications for the memory device 100. Similarly, the transmission interface circuit 58 may conform to the one or more communications specifications, and may perform communications with the memory device 100 (e.g., the transmission interface circuit 118) according to the one or more communications specification for the host device 50. For example, the multiple sub-circuits of the transmission interface circuit 118 may comprise a UFS controller 118C, a UniPro circuit 118U and a physical layer (PHY) circuit such as a MIPI M-PHY circuit 118M (labeled "M-PHY circuit" for brevity), and the transmission interface circuit 58 may be implemented to have a circuitry architecture (e.g., multiple corresponding sub-circuits) similar to or the same as that of the transmission interface circuit 118, but the present invention is not limited thereto.

In this embodiment, the host device 50 may transmit a plurality of host commands and corresponding logical addresses to the memory controller 110, to access the NV memory 120 within the memory device 100, indirectly. The memory controller 110 receives the plurality of host commands and the logical addresses, and translates the plurality of host commands into memory operating commands (which may be referred to as operating commands, for brevity), respectively, and further controls the NV memory 120 with the operating commands to perform reading or writing/programing upon the memory units or data pages of specific physical addresses within the NV memory 120, where the physical addresses can be associated with the logical addresses. For example, the memory controller 110 may generate or update at least one logical-to-physical (L2P) address mapping table to manage the relationships between the physical addresses and the logical addresses. The NV memory 120 may store a global L2P address mapping table 120T, for the memory controller 110 to control the memory device 100 to access data in the NV memory 120, but the present invention is not limited thereto. In addition, the memory controller 110 may generate or update at least one physical-to-logical (P2L) address mapping table such as a temporary P2L address mapping table 117T. For example, when there is a need, the memory controller 110 may refer to the temporary P2L address mapping table 117T to perform some internal management operations such as GC operations, etc.

For better comprehension, the global L2P address mapping table 120T may be located in a predetermined region within the NV memory element 122-1, such as a system region, but the present invention is not limited thereto. For example, the global L2P address mapping table 120T may be divided into a plurality of local L2P address mapping tables, and the plurality of local L2P address mapping tables may be stored in one or more of the NV memory elements 122-1, 122-2, . . . , and 122-N, and more particularly, may be stored in the NV memory elements 122-1, 122-2, . . . , and 122-N, respectively. When there is a needed, the memory controller 110 may load at least one portion (e.g., a portion or all) of the global L2P address mapping table 120T into the RAM 116 or other memories. For example, the memory controller 110 may load a local L2P address mapping table (e.g., a first local L2P address mapping table) among the plurality of local L2P address mapping tables into the RAM 116 to be a temporary L2P address mapping table 116T, for accessing data in the NV memory 120 according to the local L2P address mapping table which is stored as the temporary L2P address mapping table 116T, but the present invention is not limited thereto.

The memory region of the RAM 116 may comprise multiple sub-regions for temporarily storing various information such as buffered data, the temporary L2P address mapping table 116T, the temporary P2L address mapping table 117T, etc., and at least one portion of sub-regions (e.g., a portion of sub-regions or all sub-regions) among the multiple sub-regions of the memory region may be regarded as a data buffer. For example, the sub-region for temporarily storing the buffered data may be regarded as the data buffer, but the present invention is not limited thereto. According to some embodiments, the whole of the memory region, such as the multiple sub-regions for temporarily storing the buffered data, the temporary L2P address mapping table 116T, the temporary P2L address mapping table 117T, etc., may be regarded as the data buffer.

In addition, the aforementioned at least one NV memory element (e.g., the one or more NV memory elements such as {122-1, 122-2, . . . , 122-N}) may comprise a plurality of blocks, where the minimum unit that the memory controller 110 may perform operations of erasing data on the NV memory 120 may be a block, and the minimum unit that the memory controller 110 may perform operations of writing data on the NV memory 120 may be a page, but the present invention is not limited thereto. For example, any NV memory element 122-*n* (where "n" may represent any integer in the interval [1, N]) within the NV memory elements 122-1, 122-2, . . . , and 122-N may comprise multiple blocks, and a block among the multiple blocks may comprise and record a specific number of pages, where the memory controller 110 may access a certain page of a certain block among the multiple blocks according to a block address and a page address.

According to some embodiments, the memory controller 110 may monitor valid page counts of at least one portion (e.g., a portion or all) of the plurality of blocks, respectively, for subsequent processing such as the GC operations. Regarding data reception, the memory controller 110 may configure at least one block (e.g., one or more blocks) among the plurality of blocks of the aforementioned at least one NV memory element (e.g., the one or more NV memory elements such as {122-1, 122-2, . . . , 122-N}) in the NV memory 120 to be at least one active block (e.g., one or more active blocks), and utilize the aforementioned at least one active block to receive and store data from the host device 50, such as host-write data. For example, the data such as the host-write data (e.g., the data to be written into the NV memory 120) may comprise a plurality of sets of partial data, and the aforementioned at least one active block may comprise a first active block, where the temporary P2L address mapping table 117T may correspond to the first active block, and more particularly, store the associated mapping information for indicating P2L address mapping relationships regarding the first active block. In addition, the memory controller 110 may maintain (e.g., generate or update) the temporary P2L address mapping table 117T, in order to perform the associated internal management.

Figure 2:
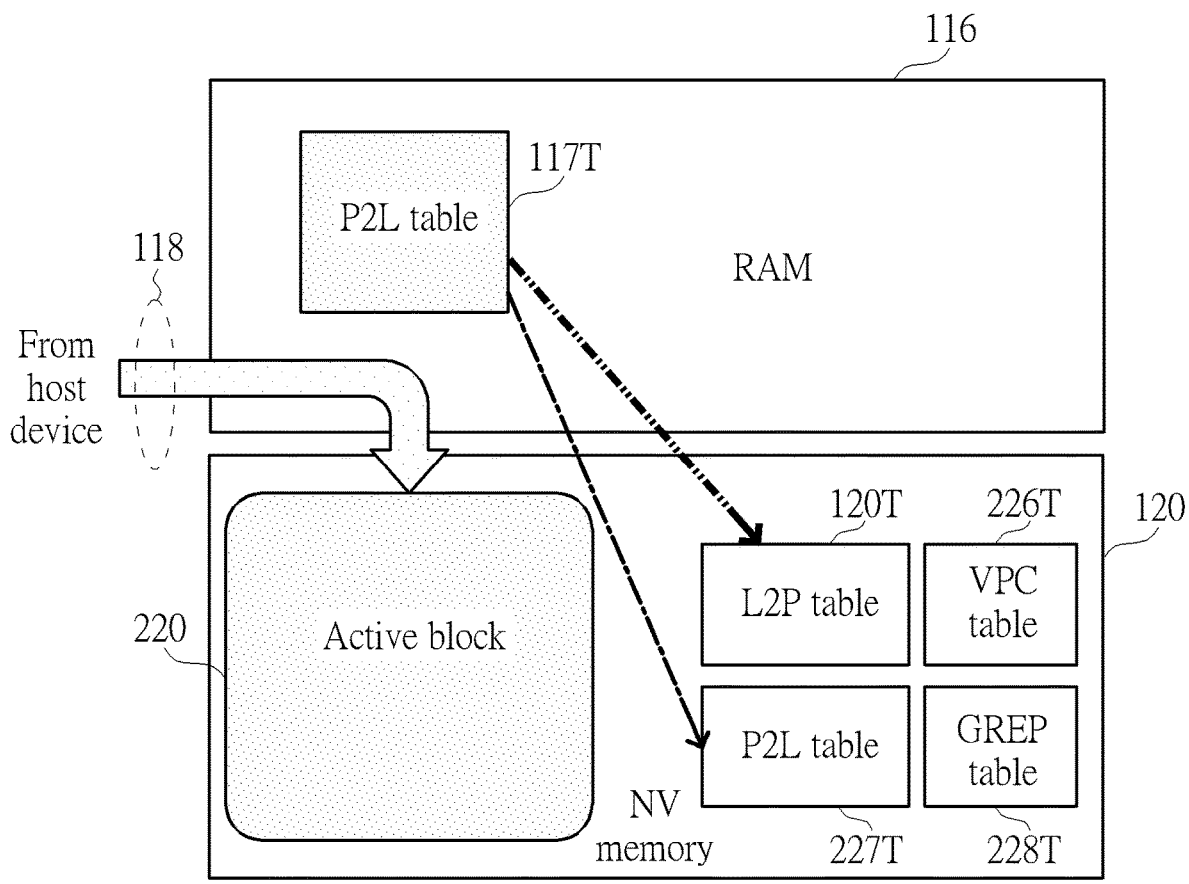
FIG. 2 illustrates a table processing control scheme according to an embodiment of the present invention.

FIG. 2 illustrates a table processing control scheme according to an embodiment of the present invention. During receiving and storing the data such as the host-write data (e.g., the data to be written into the NV memory 120) from the host device 50, the memory controller 110 may utilize the first active block such as an active block 220 to receive and store one or more sets of partial data among the plurality of sets of partial data, and record the associated mapping information such as P2L table entries into the temporary P2L address mapping table 117T (labeled "P2L table" for brevity) corresponding to the active block 220, for indicating the P2L address mapping relationships regarding the active block 220. The P2L address mapping relationships indicated by the P2L table entries may comprise the P2L address mapping relationships between the logical addresses at which the one or more sets of partial data are written by the host device 50 and the physical addresses indicating the locations where the one or more sets of partial data are stored in the active block 220. When a first predetermined criterion (e.g., the active block 220 is fully programmed, or a predetermined number of pages of the active block 220 is programmed) is met, the memory controller 110 may perform a set of table processing operations, and the set of table processing operations may comprise:

(1) a first table processing operation: updating the global L2P address mapping table 120T (labeled "L2P table" for brevity) according to the temporary P2L address mapping table 117T (labeled "P2L table" for brevity) corresponding to the active block 220, and more particularly, updating some L2P table entries (labeled "L2P entries" for brevity) in the global L2P address mapping table 120T according to the P2L table entries (labeled "P2L entries" for brevity) in the temporary P2L address mapping table 117T, for indicating L2P address mapping relationships regarding the active block 220;

(2) a second table processing operation: storing the temporary P2L address mapping table 117T (e.g., the P2L table entries therein) into the NV memory 120 to generate or update a first P2L address mapping table such as a P2L address mapping table 227T (labeled "P2L table" for brevity), for example, by writing all P2L table entries recorded in the temporary P2L address mapping table 117T into the P2L address mapping table 227T, for performing the subsequent processing mentioned above, where the P2L address mapping table 227T may be regarded as a backup version of the temporary P2L address mapping table 117T; and (3) a third table processing operation: after performing the first table processing operation (e.g., updating the global L2P address mapping table 120T according to the temporary P2L address mapping table 117T) and the second table processing operation (e.g., storing the temporary P2L address mapping table 117T into the NV memory 120), clearing the temporary P2L address mapping table 117T (e.g., the P2L table entries therein), for reusing the temporary P2L address mapping table 117T and/or the corresponding storage space in the RAM 116;

but the present invention is not limited thereto. According to some embodiments, the first table processing operation may comprise loading a certain local L2P address mapping table (e.g., the first local L2P address mapping table) within the global L2P address mapping table 120T into the RAM 116 to be the temporary L2P address mapping table 116T, updating one or more L2P table entries in the temporary L2P address mapping table 116T to indicate one or more L2P address mapping relationships among the L2P address mapping relationships regarding the active block 220, and updating the global L2P address mapping table 120T (e.g., this local L2P address mapping table therein) according to the temporary L2P address mapping table 116T.

After any active block (e.g., the active block 220) among the aforementioned at least one active block is fully programmed, the memory device 100 (e.g., the memory controller 110) may close the aforementioned any active block to make the aforementioned any active block become an inactive block, and select a blank block (e.g., an erased block) to be a replacement of the aforementioned any active block, for performing subsequent data reception corresponding to the aforementioned any active block. In addition, the subsequent processing mentioned above may comprise performing a GC procedure to write valid data among all data in the inactive block into another blank block (e.g., another erased block), but the present invention is not limited thereto.

According to some embodiments, as the P2L address mapping relationships indicated by the P2L table entries in the aforementioned at least one P2L address mapping table (e.g., the temporary P2L address mapping table 117T or the P2L address mapping table 227T) and the L2P address mapping relationships indicated by the associated L2P table entries in the L2P address mapping table 120T are supposed to be inverse address mapping relationships of each other, the memory controller 110 may determine the latest mapping information (e.g., physical addresses) carried by the associated L2P table entries in the L2P address mapping table 120T according to the latest mapping information (e.g., logical addresses) carried by the P2L table entries in the aforementioned at least one P2L address mapping table.

According to some embodiments, the memory controller 110 may operate according to one or more control schemes to perform internal management of the memory device 100, and more particularly, to generate and update a valid page count (VPC) table 226T and a group RAID-encoded page (GREP) table 228T, for recording the VPCs of the plurality of blocks and the page RAID-encoding-participation indications of the pages of multiple page groups with RAID-protection in the active block 220, respectively. For example, the page RAID-encoding-participation indications may be implemented as RAID-encoded page bits for indicating whether the pages of the multiple page groups are RAID-encoded or non-RAID-encoded, respectively, but the present invention is not limited thereto. According to some embodiments, the active block 220 may be implemented by way of a superblock XB among multiple superblocks {XB} (e.g., the superblocks {XB(0), XB(1), . . . }). In this situation, the VPCs in the VPC table 226T may represent the valid superpage (or super-page) count of the multiple superblocks {XB}, and the page RAID-encoding-participation indications in the GREP table 228T may represent the superpage RAID-encoding-participation indications of the superpages of the multiple page groups in the active block 220, respectively. For example, the superpage RAID-encoding-participation indications may be implemented as RAID-encoded superpage bits for indicating whether the superpages of the multiple page groups are RAID-encoded or non-RAID-encoded, respectively.

For example, the plurality of NV memory elements 122-1, 122-2, ..., and 122-N may be implemented as the plurality of flash memory chips such as the chips #0 and #1 or the plurality of flash memory dies such as the dies #0 and #1, respectively, where the plurality of NV memory elements 122-1, 122-2, ..., and 122-N may comprise at least two memory elements 122-1 and 122-2, and the memory element count CNT_m of the plurality of NV memory elements 122-1, 122-2, ..., and 122-N(e.g., the chip count of the plurality of flash memory chips or the die count of the plurality of flash memory dies) may vary, depending on different configurations of the NV memory 120. The aforementioned any NV memory element 122-n within the NV memory elements 122-1, 122-2, ..., and 122-N may comprise multiple planes such as the planes #0 and #1, any plane among the multiple planes may comprise its own blocks {BLK(0), BLK(1), ... }, and any block BLK( ) among the blocks {BLK(0), BLK(1), ... } may comprise its own pages {Page(0), Page(1), ... }. The memory controller 110 may combine multiple sets of corresponding blocks {{BLK(0)}, {BLK(1)}, ... } in all planes (e.g., the planes #0 and #1) of all NV memory elements into the superblocks {XB(0), XB(1), ... }, respectively, and combine multiple sets of corresponding pages {{Page(0)},{Page(1)}, ... } in all planes of all NV memory elements into the superpages {XP(0), XP(1), ... }, respectively. In addition, the memory controller 110 may access (e.g., read or write) a set of corresponding blocks {BLK(r0)} of the superblock XB(r0) according to the physical block address (PBA) XBlk(r0), and more particularly, access a set of corresponding pages {Page(r1)} of the superpage XP(r1) in the superblock XB(r0) according to the PBA XBlk(r0) and the physical page address (PPA) XPg(r1), where "r0" and "r1" may be non-negative integers.

Figure 3:
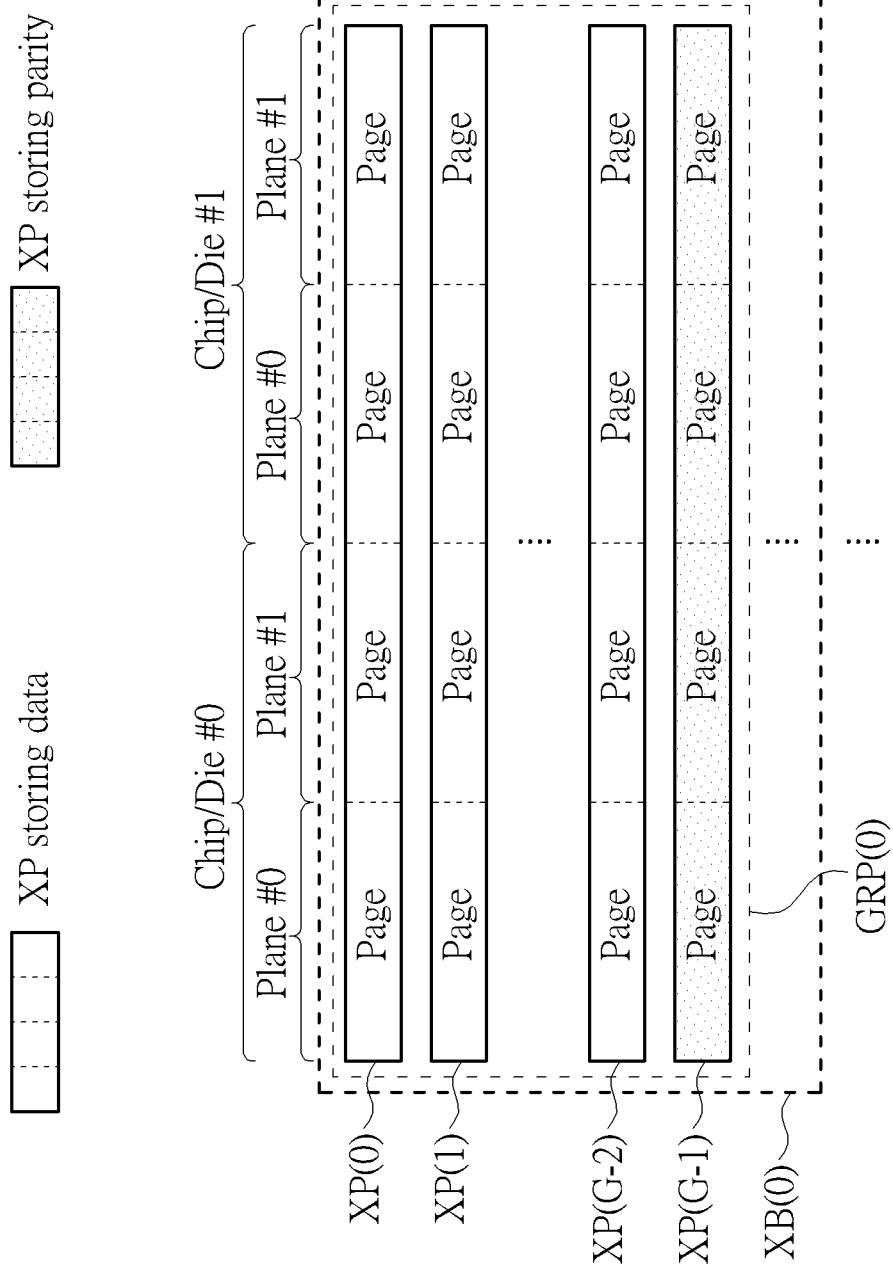
FIG. 3 illustrates a protection control scheme of a method for performing data access management of a memory device in a predetermined communications architecture to enhance SPOR of page-group-based RAID protection with aid of multi-table control using a dummy flag according to an embodiment of the present invention.

FIG. 3 illustrates a protection control scheme of a method for performing data access management of a memory device such as the memory device 100 in a predetermined communications architecture (e.g., a UFS communications architecture) to enhance SPOR of page-group-based RAID protection with aid of multi-table control using a dummy flag according to an embodiment of the present invention. The memory controller 110 may use the superblock XB (e.g., the superblock XB(0)) as the active block 220 to receive and store the host-write data into the page groups {GRP} (e.g., the page groups {GRP(0), GRP(1), ... }) in the superblock XB, each page group GRP among the page groups {GRP} may comprise G superpages {XP}, and the first (G−1) superpages and the last superpage of the G superpages {XP} may be arranged to store data (e.g., partial data of the host-write data) and a parity (e.g., a parity code) of the data, respectively, where the parameter G may be a positive integer greater than one, and may be used for indicating the superpage count per page group. For example, the page group GRP(0) may comprise the superpages {XP(0), XP(1), ..., XP(G−2), XP(G−1)}, the page group GRP(1) may comprise the superpages {XP(G), XP(G+1), ..., XP((2*G)−2), XP((2*G)−1)}, and the rest may be deduced by analogy. In the embodiment shown in FIG. 3, the memory element count CNT_m (e.g., the chip count or the die count) may be equal to two, and the plane count CNT_p of the multiple planes in the NV memory element 122-n may be equal to two, but the present invention is not limited thereto. According to some embodiments, the memory element count CNT_m and/or the plane count CNT_p may vary.

Figure 4:
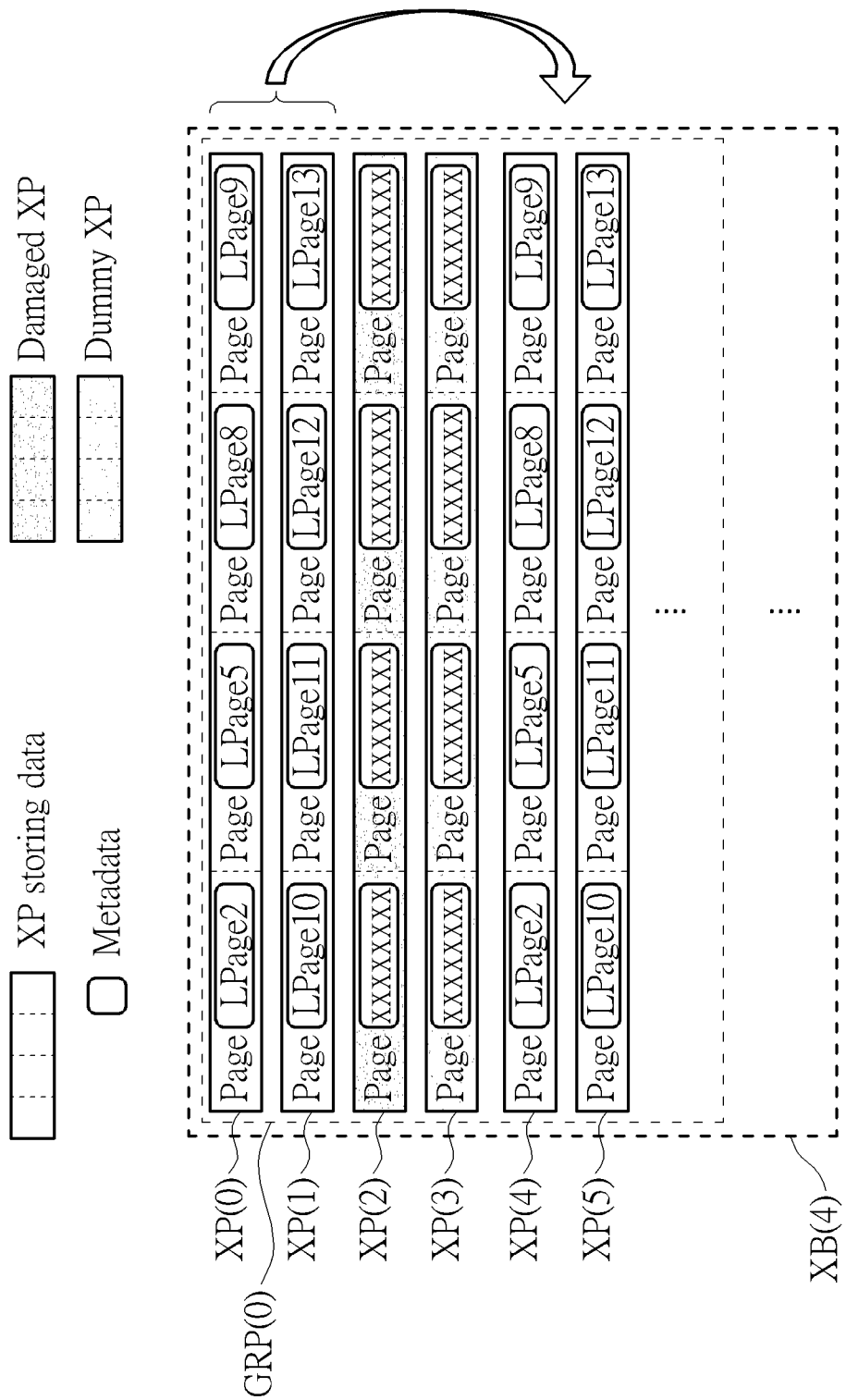
FIG. 4 illustrates a recovery control scheme of the method according to an embodiment of the present invention.

FIG. 4 illustrates a recovery control scheme of the method according to an embodiment of the present invention. Under control of the processing circuit such as the microprocessor 112, the memory controller 110 may perform data access management of the memory device 100 in the predetermined communications architecture according to the method, and more particularly, operate according to the protection control scheme, the recovery control scheme, etc. of the method to enhance the SPOR of the page-group-based RAID protection with aid of the multi-table control using the dummy flag DUMMY_FLAG. For example, after occurrence of a SPO event, the memory controller 110 may perform a SPOR procedure in response to the SPO event. After performing the SPOR procedure in response to the SPO event, the memory controller 110 may perform a table update procedure to manage at least one table regarding internal management of the memory device 10, where the aforementioned at least one table may be stored in at least one table block among the plurality of blocks. Taking the architecture shown in FIG. 2 as an example, the aforementioned at least one table may comprise the aforementioned at least one L2P address mapping table such as the L2P address mapping table 120T and the P2L address mapping table 227T (respectively labeled "L2P table" and "P2L table" in FIG. 2 for brevity), as well as other types of tables such as the VPC table 226T and the GREP table 228T.

TABLE 1

| Physical address | Logical address |
| --- | --- |
| XBlk(4), XPg(0), PL(0) | LPage2 |
| XBlk(4), XPg(0), PL(1) | LPage5 |
| XBlk(4), XPg(0), PL(2) | LPage8 |
| XBlk(4), XPg(0), PL(3) | LPage9 |
| XBlk(4), XPg(1), PL(0) | LPage10 |
| XBlk(4), XPg(1), PL(1) | LPage11 |
| XBlk(4), XPg(1), PL(2) | LPage12 |
| XBlk(4), XPg(1), PL(3) | LPage13 |
| XBlk(4), XPg(2), PL(0) | DUMMY_FLAG |
| XBlk(4), XPg(2), PL(1) | DUMMY_FLAG |
| XBlk(4), XPg(2), PL(2) | DUMMY_FLAG |
| XBlk(4), XPg(2), PL(3) | DUMMY_FLAG |
| XBlk(4), XPg(3), PL(0) | DUMMY_FLAG |
| XBlk(4), XPg(3), PL(1) | DUMMY_FLAG |
| XBlk(4), XPg(3), PL(2) | DUMMY_FLAG |
| XBlk(4), XPg(3), PL(3) | DUMMY_FLAG |
| XBlk(4), XPg(4), PL(0) | LPage2 |
| XBlk(4), XPg(4), PL(1) | LPage5 |
| XBlk(4), XPg(4), PL(2) | LPage8 |
| XBlk(4), XPg(4), PL(3) | LPage9 |
| XBlk(4), XPg(5), PL(0) | LPage10 |
| XBlk(4), XPg(5), PL(1) | LPage11 |
| XBlk(4), XPg(5), PL(2) | LPage12 |
| XBlk(4), XPg(5), PL(3) | LPage13 |
| XBlk(4), XPg(6), PL(0) | (Next host write LPage) |
| XBlk(4), XPg(6), PL(1) | (Next host write LPage) |
| XBlk(4), XPg(6), PL(2) | (Next host write LPage) |
| XBlk(4), XPg(6), PL(3) | (Next host write LPage) |
| ... | ... |

TABLE 2

| Physical address | Valid superpage bit |
| --- | --- |
| XBlk(4), XPg(0) | 1 |
| XBlk(4), XPg(1) | 1 |
| XBlk(4), XPg(2) | 0 |

TABLE 2-continued

| Physical address | Valid superpage bit |
| --- | --- |
| XBlk(4), XPg(3) | 0 |
| XBlk(4), XPg(4) | 1 |
| XBlk(4), XPg(5) | 1 |
| XBlk(4), XPg(6) | 1 |
| ... | ... |

TABLE 3

| Logical address | Physical address |
| --- | --- |
| LPage0 | |
| LPage1 | |
| LPage2 | XBlk(4), XPg(4), PL(0) |
| LPage3 | |
| LPage4 | |
| LPage5 | XBlk(4), XPg(4), PL(1) |
| LPage6 | |
| LPage7 | |
| LPage8 | XBlk(4), XPg(4), PL(2) |
| LPage9 | XBlk(4), XPg(4), PL(3) |
| LPage10 | XBlk(4), XPg(5), PL(0) |
| LPage11 | XBlk(4), XPg(5), PL(1) |
| LPage12 | XBlk(4), XPg(5), PL(2) |
| LPage13 | XBlk(4), XPg(5), PL(3) |
| LPage14 | |
| LPage15 | |
| ... | ... |

Table 1 illustrates an example of the temporary P2L address mapping table 117T in the RAM 116, Table 2 illustrates an example of the GREP table 228T, and Table 3 illustrates an example of the first L2P address mapping table within the global L2P address mapping table 120T, where the symbol " . . . " may indicate that some table contents of Tables 1, 2 and 3 may be omitted, and the plane addresses {PL(0), PL(1)} and {PL(2), PL(3)} in the physical addresses as shown in Tables 1 and 3 may indicate the planes #0 and #1 of the chip/die #0 and the planes #0 and #1 of the chip/die #1, respectively, but the present invention is not limited thereto. According to some embodiments, the table contents and/or the table format of any table among Tables 1, 2 and 3 may vary. For example, as the ranking or arrangement of the table contents in the temporary P2L address mapping table 117T shown in Table 1 may correspond to the physical addresses, the field "Physical address" of Table 1 may be omitted. For another example, as the ranking or arrangement of the table contents in the GREP table 228T shown in Table 2 may correspond to the physical addresses, the field "Physical address" of Table 2 may be omitted. For yet another example, as the ranking or arrangement of the table contents in the first L2P address mapping table shown in Table 3 may correspond to the logical addresses, the field "Logical address" of Table 3 may be omitted.

The memory controller 110 may write the host-write data and the corresponding metadata into the physical pages in the active block 220, respectively, where the metadata of the data stored in any physical page among the physical pages may comprise the logical address of the data stored in the aforementioned any physical page. Taking the architecture shown in FIG. 4 as an example, before the SPO event, the memory controller 110 may write first data of the logical addresses {LPage2, LPage5, LPage8, LPage9} among the host-write data and the metadata of the first data into the superpage XP(0), and write second data of the logical addresses {LPage10, LPage11, LPage12, LPage13} among the host-write data and the metadata of the second data into the superpage XP(1), to make the metadata in the pages of the superpages XP(0) and XP(1) carry the logical addresses {LPage2, LPage5, LPage8, LPage9} and {LPage10, LPage11, LPage12, LPage13}, respectively. After the SPO event, the memory controller 110 may perform the SPOR procedure to write dummy data into the superpage XP(3), and more particularly, write the first data and the metadata thereof into the superpage XP(4), and write the second data and the metadata thereof into the superpage XP(5), to make the metadata in the pages of the superpages XP(4) and XP(5) carry the logical addresses {LPage2, LPage5, LPage8, LPage9} and {LPage10, LPage11, LPage12, LPage13}, respectively. In addition, as the superpage XP(2) is damaged, no metadata can be correctly read out from the pages of the superpage XP(2) (labeled "xxxxxxxx" for brevity). Additionally, as the superpage XP(3) is written as a dummy superpage, the memory controller 110 may simply write the dummy data into the pages of the superpage XP(3), having no need to write any metadata (labeled "xxxxxxxx" for brevity). According to some embodiments, as long as implementation of the method will not be hindered, the memory controller 110 may skip carrying the logical address in the metadata.

According to the embodiment shown in FIG. 4, the metadata in the aforementioned any physical page may be arranged to carry the logical address of a logical storage unit of the host device 50, such as any logical address among the logical addresses {LPage2, LPage5, LPage8, LPage9} and {LPage10, LPage11, LPage12, LPage13}, for indicating that the aforementioned any physical page stores the data of the logical storage unit, but the present invention is not limited thereto. According to some embodiments, the metadata in the aforementioned any physical page may be arranged to carry at least one logical address of at least one logical storage unit of the host device 50, for indicating that the aforementioned any physical page stores the data of the aforementioned at least one logical storage unit. More particularly, the aforementioned any physical page may be large enough to store data of multiple logical storage units (e.g., multiple logical blocks) of the host device 50, and the metadata in the aforementioned any physical page may be arranged to carry multiple logical addresses (e.g., multiple logical block addresses (LBAs)) of the multiple logical storage units, for indicating that the aforementioned any physical page stores the data of the multiple logical storage units. For example, the data size of a logical storage unit among the multiple logical storage units may be equal to 4 kilobytes (KB), and the total data size of the multiple logical storage units may be equal to 16 KB. In this situation, the metadata in the aforementioned any physical page may be arranged to carry four logical addresses (e.g., four LBAs) of four logical storage units (e.g., four logical blocks), for indicating that the aforementioned any physical page stores the data of the four logical storage units. For brevity, similar descriptions for these embodiments are not repeated in detail here.

Further details regarding RAID encoding may be described as follows. According to some embodiments, at a certain moment during receiving and storing the host-write data into the active block 220, the memory controller 110 may be receiving and storing the host-write data into a current page group GRP of the page groups {GRP} in the active block 220. During receiving and storing the host-write data into the current page group GRP, the memory controller 110 may utilize the RAID circuit 115R to generate and update a parity PRT of the data stored in one or more sets of non-damaged and non-dummy pages (e.g., the pages of one or more non-damaged and non-dummy superpages {XP}), such as a bitwise exclusive OR (XOR) result of the data, for protecting the one or more sets of non-damaged and non-dummy pages and preparing for completing the RAID encoding of the current page group GRP. For example, the parity PRT may be regarded as a RAID parity. The memory controller 110 may temporarily store the parity PRT such as the bitwise XOR result in a parity region 116R within the RAM 116, and update the parity PRT as the number of the one or more sets of non-damaged and non-dummy pages increases, and more particularly, update the parity PRT as a written-page count WPC (e.g., the number of written pages) of the current page group GRP increases, where the written-page count WPC may be counted according to all pages of the current page group GRP that have been written, no matter whether there is any damaged page or any dummy page in the current page group GRP. When the written-page count WPC reaches a predetermined page count WPC1, the memory controller 110 may write the latest parity PRT (e.g., the latest version of the parity PRT in the RAM 116) into a set of parity pages (e.g., the pages of the last superpage XP) of the current page group GRP, in order to complete writing of the current page group GRP, for protecting the data. The written-page count WPC and the predetermined page count WPC1 may be measured in unit of superpage, where WPC1=(G−1), but the present invention is not limited thereto.

In addition, when no SPO event occurs during writing the current page group GRP, the memory controller 110 may generate the parity PRT(WPC) of the superpages {XP(0), . . . XP(WPC)} according to the data of the superpage XP(WPC) and the parity PRT(WPC−1) of the superpages {XP(0), . . . , XP(WPC−1)}, and more particularly, perform a bitwise XOR operation on the data of the superpage XP(WPC) and the parity PRT(WPC−1) to generate a bitwise XOR result to be the parity PRT(WPC). When the SPO event occurs during writing the current page group GRP, the memory controller 110 may skip the RAID encoding of any damaged or dummy superpage XP(WPC_d) and maintain the parity PRT(WPC_d) to be equal to the parity PRT(WPC_d−1), and generate the parity PRT(WPC) as usual for other superpages {XP} in the current page group GRP, for example, by performing a bitwise XOR operation on the data of the superpage XP(WPC) and the parity PRT(WPC−1) to generate a bitwise XOR result to be the parity PRT(WPC).

Taking the page group GRP(0) shown in FIG. 4 as an example of the current page group GRP, when WPC=1, the memory controller 110 may have written the superpage XP(0) and may write the data of the superpage XP(0) into the RAM 116 to be the parity PRT(0) of the superpage XP(0); when WPC=2, the memory controller 110 may have written the superpages {XP(0), XP(1)} and may perform a bitwise XOR operation on the data of the superpage XP(1) and the parity PRT(0) to generate a bitwise XOR result to be the parity PRT(1) of the superpages {XP(0), XP(1)}; when WPC=3, the SPO event may occur at the time point t1, and the memory controller 110 may re-generate the parity PRT (1) according to the data read from the superpages {XP(0), XP(1)} in the SPOR procedure, to recover the parity PRT(1) in the RAM 116 and maintain PRT(2)=PRT(1), where RAID encoding of the damaged superpage XP(2) should be skipped, as indicated by the dummy flag DUMMY_FLAG carried by the associated P2L table entries in the temporary P2L address mapping table 117T; when WPC=4, the memory controller 110 may write the dummy superpage XP(3) and maintain PRT(3)=PRT(2), where RAID encoding of the dummy superpage XP(3) should be skipped, as indicated by the dummy flag DUMMY_FLAG carried by the associated P2L table entries in the temporary P2L address mapping table 117T; when WPC=5, the memory controller 110 may have written the superpages {XP(0), . . . , XP(4)} (which may comprise the damaged superpage XP(2) and the dummy superpage XP(3)) and may perform a bitwise XOR operation on the data of the superpage XP(4) and the parity PRT(3) (e.g., PRT(3)=PRT(2) =PRT(1)) to generate a bitwise XOR result to be the parity PRT(4); when WPC=6, the memory controller 110 may have written the superpages {XP(0), . . . , XP(5)} (which may comprise the damaged superpage XP(2) and the dummy superpage XP(3)) and may perform a bitwise XOR operation on the data of the superpage XP(5) and the parity PRT(4) to generate a bitwise XOR result to be the parity PRT(5); and the rest may be deduced by analogy, for example, when WPC=WPC1, the memory controller 110 may have written the superpages {XP(0), . . . , XP(WPC1−1)} (which may comprise the damaged superpage XP(2) and the dummy superpage XP(3)) and may perform a bitwise XOR operation on the data of the superpage XP(WPC1−1) and the parity PRT(WPC1−2) to generate a bitwise XOR result to be the latest parity mentioned above, such as the parity PRT(WPC1−1). For better comprehension, assume that G=20, and the memory controller 110 may write the parity PRT(18) into the set of parity pages (e.g., the pages of the superpage XP(19)) of the page group GRP(0), to complete writing of the page group GRP(0). For brevity, similar descriptions for these embodiments are not repeated in detail here.

Figure 5:
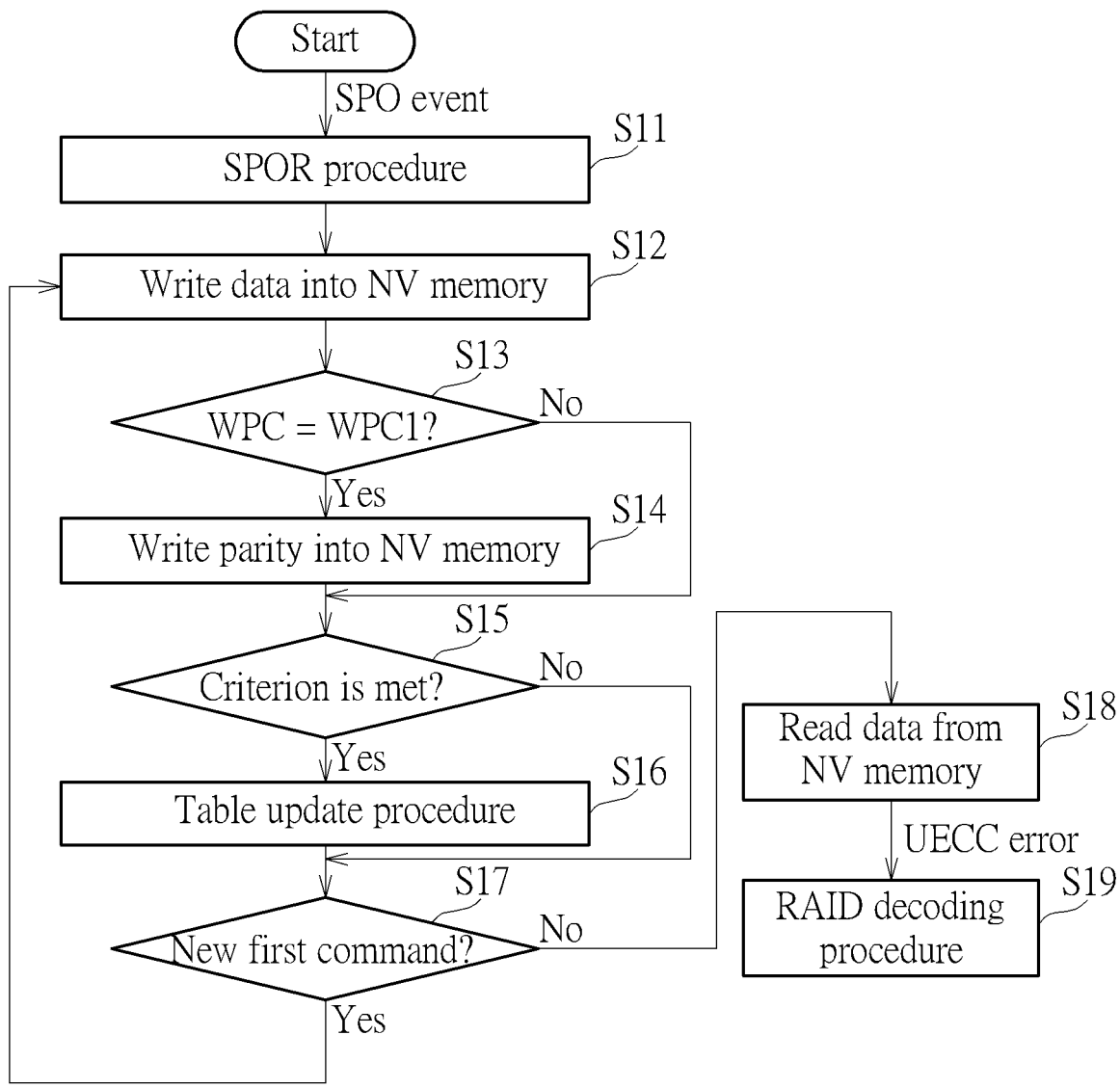
FIG. 5 illustrates a main working flow of the method according to an embodiment of the present invention.

FIG. 5 illustrates a main working flow of the method according to an embodiment of the present invention. For example, the memory controller 110 may use the superblock XB(4) as the active block 220 to receive and store the host-write data into the current page group GRP such as the page group GRP(0), and more particularly, may be receiving and storing a set of partial data into the superpage XP(2) at a time point t1, and the SPO event may occur at the time point t1.

In Step S11, after the time point t1, the memory controller 110 may perform the SPOR procedure. As a result, the memory controller 110 may process subsequent superpages XP(3), XP(4) and XP(5). In the SPOR procedure, the current page group GRP may be regarded as a damaged page group GRP affected by the SPO event. After performing the SPOR procedure in response to the SPO event, the memory controller 110 may write subsequent data into at least one set of subsequent pages in the damaged page group GRP (e.g., the page group GRP(0)). More particularly, in the loop comprising Steps S12-S17, the memory controller 110 may execute Step S12 one or more times to write at least one set of subsequent data into at least one set of subsequent pages (e.g., the pages of the subsequent superpages {XP(6), . . . , XP(G−2)}) in the damaged page group GRP.

In Step S12, in response to a first command (e.g., a write command) from the host device 50, the memory controller 110 may write subsequent data into the NV memory 120, and more particularly, write the subsequent data into the active block 220 such as the superblock XB(4), where the first command may indicate that writing the subsequent data into the NV memory 120 is requested. For example, the SPO event may occur at the time point t1 as mentioned above, and the memory controller 110 may write the subsequent data into the superblock XB(4), starting from the superpage XP(6).

In Step S13, the memory controller 110 may determine whether the written-page count WPC of the current page group GRP reaches the predetermined page count WPC1. If Yes (e.g., WPC=WPC1), Step S14 is entered; if No (e.g., WPC<WPC1), Step S15 is entered. The written-page count WPC and the predetermined page count WPC1 may be measured in unit of superpage, for example, when G=20, WPC1=(G−1)=19, but the present invention is not limited thereto. According to some embodiments, the written-page count WPC and the predetermined page count WPC1 may be measured in unit of physical page. For example, when G=20 and CNT_m=CNT_p=2, WPC1=((G−1)*(CNT_m*CNT_p))=(19*(2*2))=76.

In Step S14, the memory controller 110 may write the latest parity (e.g., the latest version of the parity in the RAM 116) into the NV memory 120, and more particularly, write the latest parity into the set of parity pages (e.g., the pages of the last superpage XP) of the current page group GRP, in order to complete writing of the current page group GRP.

In Step S15, the memory controller 110 may determine whether at least one predetermined criterion is met. If Yes, Step S16 is entered; if No, Step S17 is entered.

In Step S16, when the aforementioned at least one predetermined criterion is met, the memory controller 110 may perform the table update procedure. For example, a first predetermined criterion among the aforementioned at least one predetermined criterion may comprise a P2L table entry count of the temporary P2L address mapping table 117T reaching a predetermined P2L table entry count, where the predetermined P2L table entry count may represent a predetermined table size of the temporary P2L address mapping table 117T. When the P2L table entry count of the temporary P2L address mapping table 117T reaches the predetermined P2L table entry count, the memory controller 110 may perform the table update procedure.

In Step S17, the memory controller 110 may determine whether any new first command (e.g., any write command) from the host device 50 is received. If Yes, Step S12 is entered; if No, Step S18 is entered.

In Step S18, in response to a set of second commands from the host device 50, the memory controller 110 may read stored data from the NV memory 120, where the set of second commands may indicate that reading the stored data from the NV memory 120 is requested.

In Step S19, in response to occurrence of an uncorrectable error correction code (UECC) error of a target page group GRP_t, the memory controller 110 may perform a RAID decoding procedure. For example, the target page group GRP_t may represent a certain page group GRP storing data among all page groups {GRP} of a superblock XB, such as the current page group GRP in the active block 220 or a page group GRP in a certain inactive block.

For better comprehension, the method may be illustrated with the working flow shown in FIG. 5, but the present invention is not limited thereto. According to some embodiments, one or more steps may be added, deleted, or changed in the working flow shown in FIG. 5.

According to some embodiments, the written-page count WPC and the predetermined page count WPC1 may be measured in unit of physical page, and more particularly, when CNT_m=CNT_p=1, each page group GRP among the page groups {GRP} may comprise G pages, such as the first (G−1) pages storing data and the last page storing the parity of the data, where the parameter G may indicate the page count per page group. For example, when G=20 and CNT_m=CNT_p=1, WPC1=((G−1)*(CNT_m*CNT_p))=(19*(1*1))=19. For brevity, similar descriptions for these embodiments are not repeated in detail here.

Figure 6:
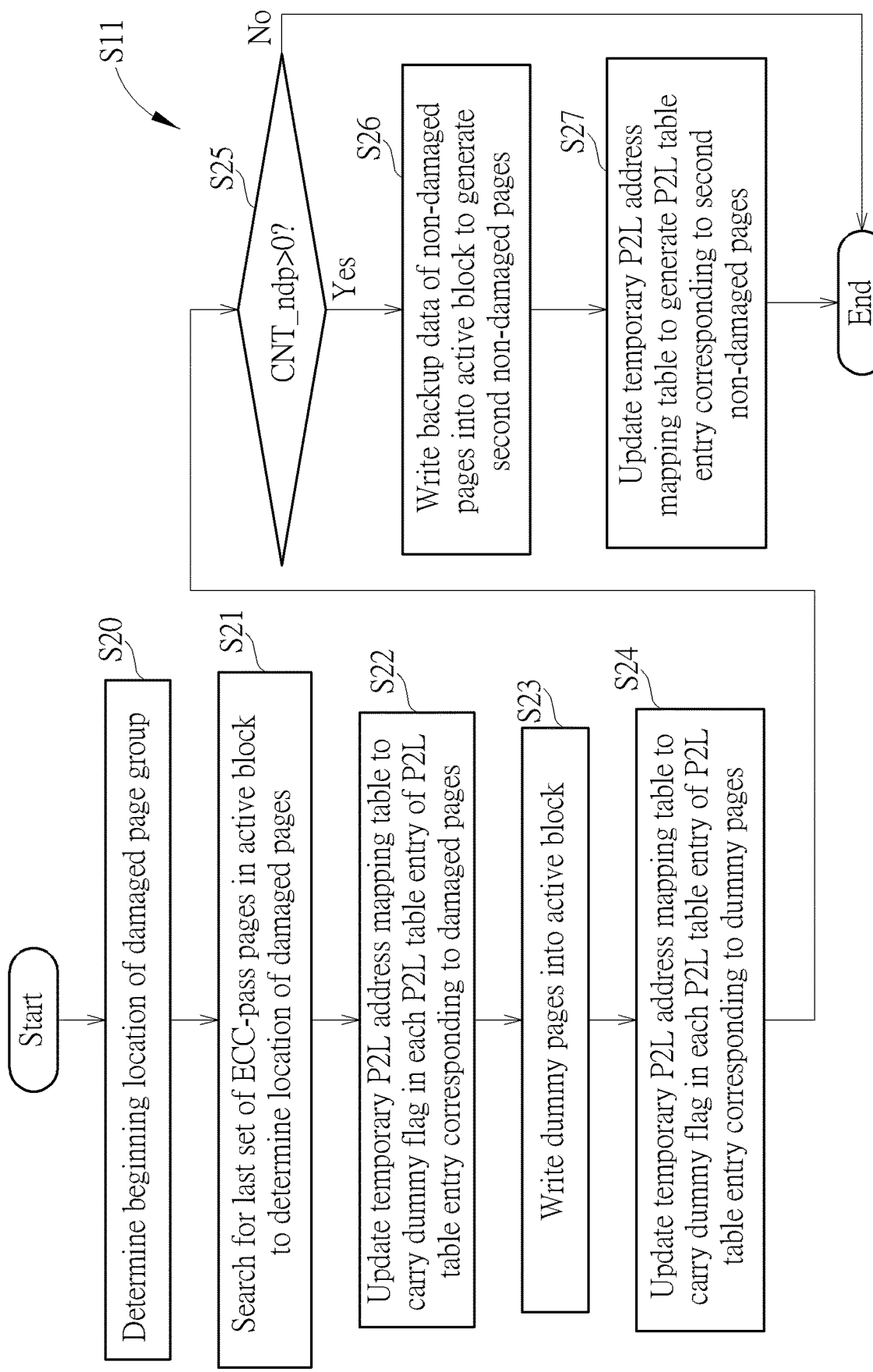
FIG. 6 illustrates the SPOR procedure of the main working flow shown in FIG. 5 according to an embodiment of the present invention.

FIG. 6 illustrates the SPOR procedure of the main working flow shown in FIG. 5 according to an embodiment of the present invention. For example, the SPOR procedure may comprise the operations of Steps S20-S27.

In Step S20, the memory controller 110 may determine which page group GRP in the active block 220 (e.g., the superblock XB(4) shown in FIG. 4) is the damaged page group GRP, and more particularly, determine the beginning location of the damaged page group GRP. For example, during receiving and storing the host-write data into the active block 220, the memory controller 110 may record and update a completed page group count CNT_cpg such as the number of completed page groups {GRP} (e.g., the page groups {GRP} comprising their own parity pages) that have been written into the active block 220, and store the completed page group count CNT_cpg into the NV memory 120, where the completed page group count CNT_cpg may be a non-negative integer. When executing Step S20, the memory controller 110 may determine the beginning location of the damaged page group GRP to be the superpage XP(CNT_cpg*G).

In Step S21, the memory controller 110 may search for the last set of ECC-pass pages in the active block 220 to determine the location of at least one set of damaged pages (e.g., the pages of the damaged superpage XP(2)). For example, the memory controller 110 may try reading one or more sets of pages (e.g., one or more superpages {XP}) in the damaged page group GRP, starting from the beginning location (or the first superpage XP) of the damaged page group GRP, to determine whether any UECC error occurs, and more particularly, back up any set of ECC-pass pages (e.g., the pages of any ECC-pass superpage XP) having no UECC error into another block among the plurality of blocks and try reading the next set of pages (e.g., the next superpages XP), until the aforementioned at least one set of damaged pages (e.g., the pages of the damaged superpage XP(2)) having the aforementioned any UECC error is found. In addition, the memory controller 110 may record and update a non-damaged-page count CNT_ndp for indicating the number of ECC-pass superpages {XP} found in the operation of Step S21, and may increase the non-damaged-page count CNT_ndp with an increment such as one when the aforementioned any ECC-pass superpage XP is found, where the non-damaged-page count CNT_ndp may have an initial value such as zero, and may be measured in unit of superpage, but the present invention is not limited thereto. According to some embodiments, the non-damaged-page count CNT_ndp may be measured in unit of physical page.

In Step S22, the memory controller 110 may update the temporary P2L address mapping table 117T corresponding to the active block 220 (e.g., the superblock XB(4)) to carry the dummy flag DUMMY_FLAG in each P2L table entry of at least one P2L table entry corresponding to the aforementioned at least one set of damaged pages (e.g., the pages of the damaged superpage XP(2)).

In Step S23, the memory controller 110 may write at least one set of dummy pages (e.g., the pages of the dummy superpage XP(3)) into the active block 220 such as the superblock XB(4). The memory controller 110 may write any set of dummy pages (e.g., the pages of the dummy superpage XP(3)) among the aforementioned at least one set of dummy pages into the active block 220 and try reading the aforementioned any set of dummy pages to determine whether any UECC error occurs. For example, if no UECC error occurs, which means the operation of Step S23 is completed, the memory controller 110 may prevent repeating the operations of writing the aforementioned any set of dummy pages and trying reading the aforementioned any set of dummy pages for any subsequent location (e.g., the location of the superpage XP(4)) in the damaged page group GRP, where the aforementioned at least one set of dummy pages may comprise a single set of dummy pages (e.g., the pages of the dummy superpage XP(3), as illustrated in FIG. 4); otherwise, the memory controller 110 may repeat these operations for a subsequent location (e.g., the location of the superpage XP(4)) in the damaged page group GRP until no UECC error occurs, where the aforementioned at least one set of dummy pages may comprise two or more sets of dummy pages, such as the pages of the superpages XP(3), XP(4), etc.

In Step S24, the memory controller 110 may update the temporary P2L address mapping table 117T to carry the dummy flag DUMMY_FLAG in each P2L table entry of at least one P2L table entry corresponding to the aforementioned at least one set of dummy pages (e.g., the pages of the dummy superpage XP(3)).

In Step S25, the memory controller 110 may determine whether the non-damaged-page count CNT_ndp is greater than zero. If Yes, Step S26 is entered; if No, the working flow shown in FIG. 6 comes to the end. The memory controller 110 may determine whether at least one set of first non-damaged pages (e.g., the pages of the aforementioned any ECC-pass superpage XP) exists in the damaged page group GRP during executing Step S21. For example, for the case that the aforementioned any ECC-pass superpage XP is found in the operation of Step S21, the aforementioned at least one set of first non-damaged pages such as the pages of the ECC-pass superpages {XP} (e.g., the pages of the non-damaged superpages XP(0) and XP(1)) may have been backed up into the other block, and the backup data thereof may be protected in the other block to prevent any possible data loss due to the operation of Step S23. As a result, the backup data is ready for being read out to perform the operation of Step S26.

In Step S26, when CNT_ndp>0, the memory controller 110 may write the backup data of the aforementioned at least one set of first non-damaged pages into the active block 220 such as the superblock XB(4) to generate at least one set of second non-damaged pages (e.g., the pages of the superpages XP(4) and XP(5)), for being protected by a set of parity pages (e.g., the pages of the superpage XP(G-1) in the superblock XB(4)) after the RAID encoding of the damaged page group GRP (e.g., the page group GRP(0)) is completed.

In Step S27, the memory controller 110 may update the temporary P2L address mapping table 117T to generate at least one P2L table entry corresponding to the aforementioned at least one set of second non-damaged pages (e.g., the pages of the superpages XP(4) and XP(5)).

For better comprehension, the SPOR procedure may be illustrated with the working flow shown in FIG. 6, but the present invention is not limited thereto. According to some embodiments, one or more steps may be added, deleted, or changed in the working flow shown in FIG. 6.

Some implementation details regarding the RAID encoding may be described as follows. According to some embodiments, after executing Step S12 multiple times to write the subsequent data into the superpages {XP(6), ..., XP(G-2)} (e.g., the superpages {XP(6), ..., XP(WPC1-1)}) and executing Step S14 to write the parity PRT(G-2) (e.g., the parity PRT(WPC1-1)) into the superpage XP(G-1) in the working flow shown in FIG. 5, the memory controller 110 may have completed the operations of the RAID encoding of the page group GRP(0), such as the operations of utilizing the RAID circuit 115R to perform RAID encoding on the data of the superpages {XP(0), XP(1), XP(4), XP(5), XP(6), ..., XP(G-2)} to generate the corresponding parity PRT(G-2) and storing the parity PRT(G-2) into the superpage XP(G-1). For example, assuming that G=20 and there is no other damaged page group GRP in the superblock XB(4), after completing the RAID encoding of the page groups GRP(0), GRP(1), GRP(2), etc. in the superblock XB(4), the memory controller 110 may use the parity PRT(18) in the superpage XP(19) to protect the data of the superpages {XP(0), XP(1), XP(4), ..., XP(18)}, use the parity PRT(38) in the superpage XP(39) to protect the data of the superpages {XP(20), ..., XP(38)}, and use the parity PRT(58) in the superpage XP(59) to protect the data of the superpages {XP(40), ..., XP(58)}, and the rest may be deduced by analogy. For brevity, similar descriptions for these embodiments are not repeated in detail here.

Figure 7:
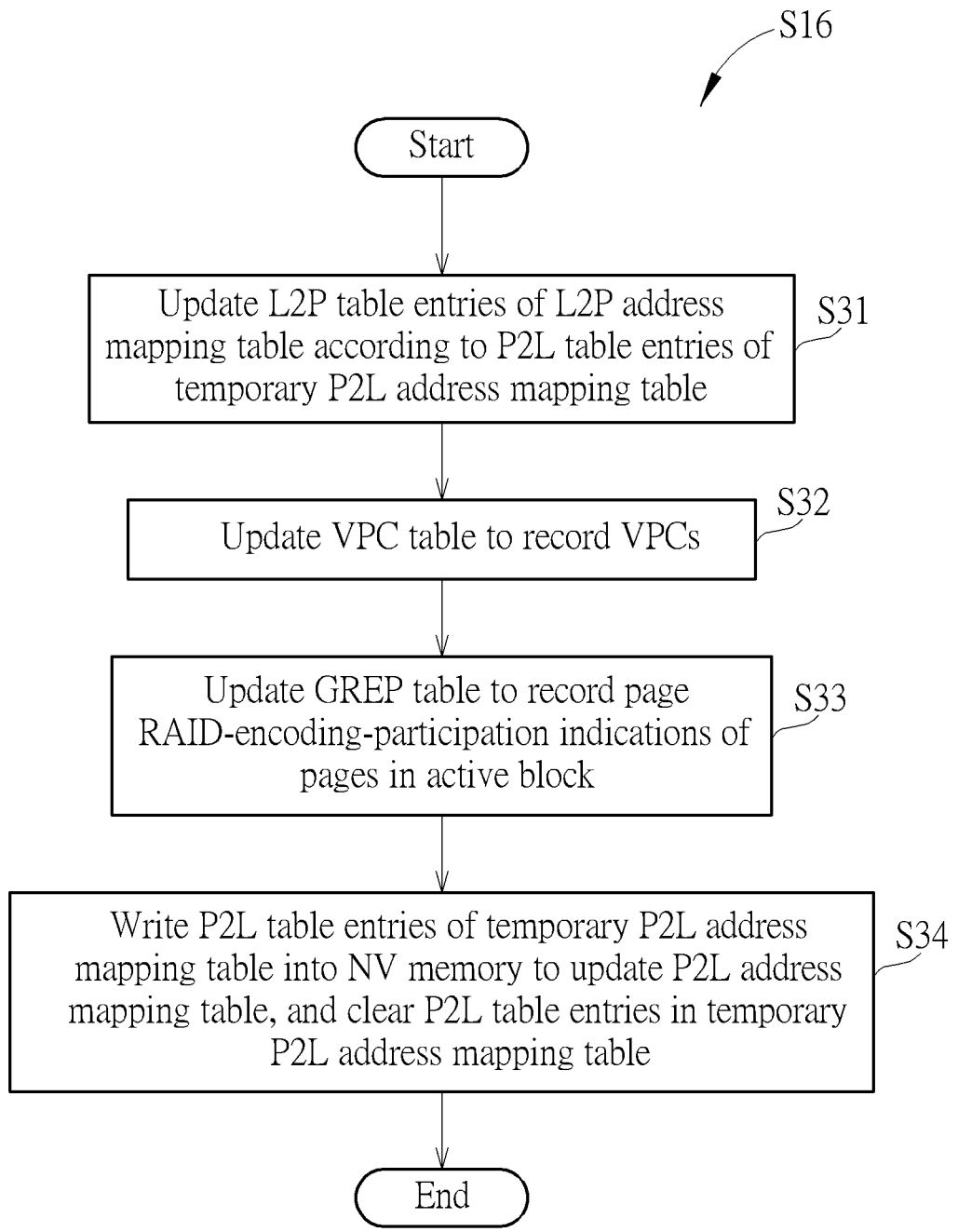
FIG. 7 illustrates the table update procedure of the main working flow shown in FIG. 5 according to an embodiment of the present invention.

FIG. 7 illustrates the table update procedure of the main working flow shown in FIG. 5 according to an embodiment of the present invention. In response to the aforementioned at least one predetermined criterion being met, the memory controller 110 may perform the table update procedure, where the table update procedure may comprise the operations of Steps S31-S34.

In Step S31, the memory controller 110 may update multiple L2P table entries of the global L2P address mapping table 120T according to multiple P2L table entries of the temporary P2L address mapping table 117T, for indicating the latest address mapping relationships.

In Step S32, the memory controller 110 may update the VPC table 226T to record the associated VPCs.

In Step S33, the memory controller 110 may update the GREP table 228T to record multiple page RAID-encoding-participation indications of multiple sets of pages in the active block 220, for indicating whether the multiple sets of pages are valid or invalid, respectively. For example, in response to existence of the dummy flag DUMMY_FLAG in each P2L table entry of the aforementioned at least one P2L table entry corresponding to the aforementioned at least one set of damaged pages (e.g., the pages of the damaged superpage XP(2)), the memory controller 110 may record at least one first page RAID-encoding-participation indication (e.g., the first "0" among the bits {1, 1, 0, 0, 1, ... } of the GREP table 228T shown in Table 2) corresponding to the aforementioned at least one set of damaged pages among the multiple page RAID-encoding-participation indications to be a first predetermined RAID-encoding-participation indication (e.g., the bit "0") for indicating that the aforementioned at least one set of damaged pages are invalid.

For another example, in response to existence of the dummy flag DUMMY_FLAG in each P2L table entry of the aforementioned at least one P2L table entry corresponding to the aforementioned at least one set of dummy pages (e.g., the pages of the dummy superpage XP(3)), the memory controller 110 may record at least one second page RAID-encoding-participation indication (e.g., the second "0" among the bits {1, 1, 0, 0, 1, ... } of the GREP table 228T shown in Table 2) corresponding to the aforementioned at least one set of dummy pages among the multiple page RAID-encoding-participation indications to be the first predetermined RAID-encoding-participation indication (e.g., the bit "0") for indicating that the aforementioned at least one set of dummy pages are invalid.

For yet another example, in response to non-existence of the dummy flag DUMMY_FLAG in each P2L table entry of the aforementioned at least one P2L table entry corresponding to the aforementioned at least one set of second non-damaged pages (e.g., the pages of the superpages XP(4) and XP(5)), the memory controller 110 may record at least one other page RAID-encoding-participation indication (e.g., the third "1" among the bits {1, 1, 0, 0, 1, . . . } of the GREP table 228T shown in Table 2, for the case of the superpage XP(4)) corresponding to the aforementioned at least one set of second non-damaged pages among the multiple page RAID-encoding-participation indications to be a second predetermined RAID-encoding-participation indication (e.g., the bit "1") for indicating that the aforementioned at least one set of second non-damaged pages are valid.

In Step S34, the memory controller 110 may write the P2L table entries of temporary P2L address mapping table 117T into the NV memory 120 to update the P2L address mapping table 227T, and clear the P2L table entries in the temporary P2L address mapping table 117T.

For better comprehension, the table update procedure may be illustrated with the working flow shown in FIG. 7, but the present invention is not limited thereto. According to some embodiments, one or more steps may be added, deleted, or changed in the working flow shown in FIG. 7.

Figure 8:
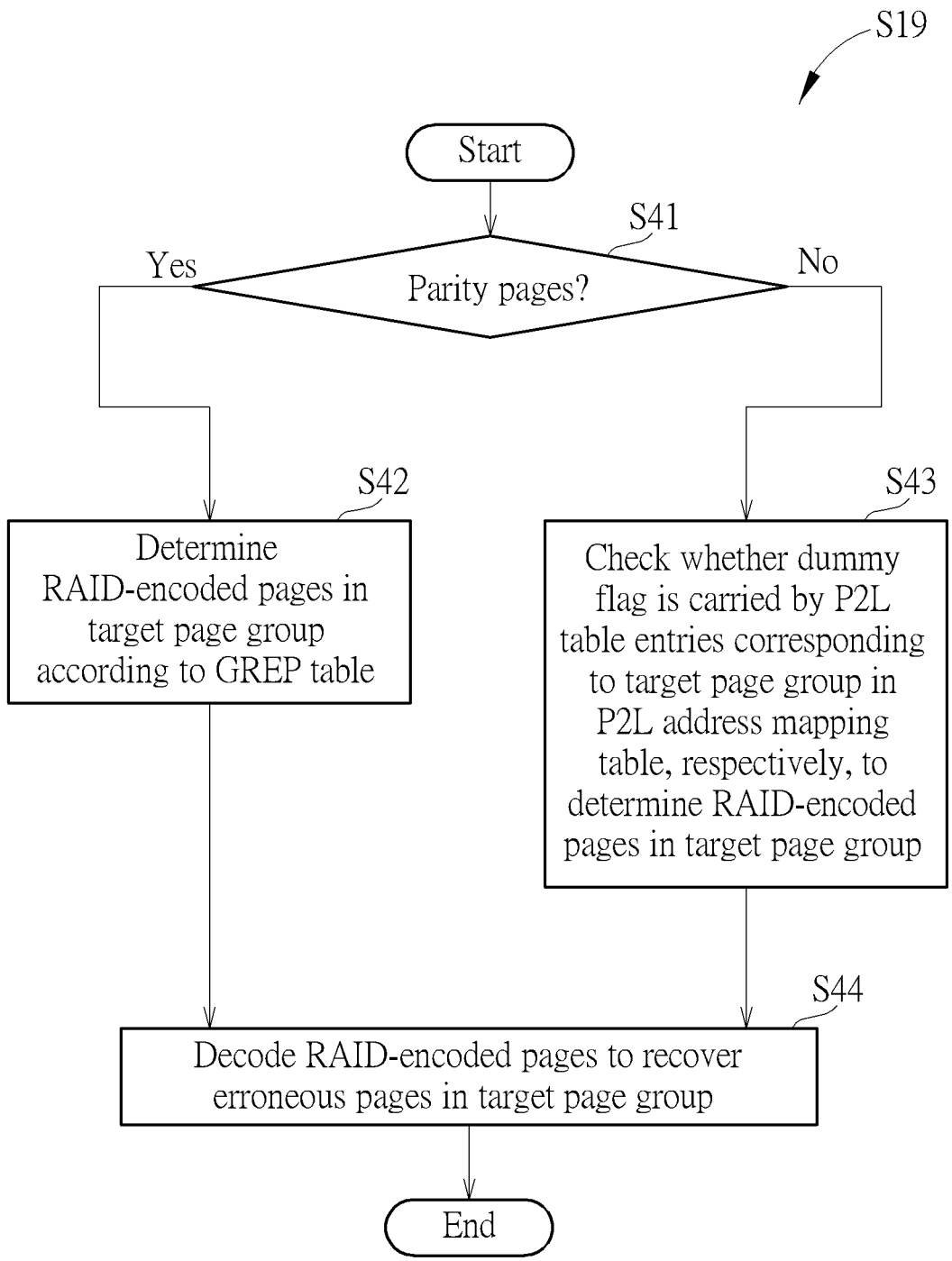
FIG. 8 illustrates the RAID decoding procedure of the main working flow shown in FIG. 5 according to an embodiment of the present invention.

FIG. 8 illustrates the RAID decoding procedure of the main working flow shown in FIG. 5 according to an embodiment of the present invention. For example, when trying reading a set of erroneous pages (e.g., an erroneous superpage XP) having some errors in the target page group GRP_t, the memory controller 110 may fail to correct the errors by using the ECC circuit 115E, and therefore determine that the UECC error occurs. In response to the occurrence of the UECC error of the target page group GRP_t, the memory controller 110 may perform the RAID decoding procedure, where the RAID decoding procedure may comprise the operations of Steps S41-S44.

In Step S41, the memory controller 110 may determine whether generating a parity PRT (e.g., the parity PRT (WPC1-1)) in a set of parity pages (e.g., the last set of pages, such as the pages of the last superpage XP) of the target page group GRP_t has been completed. If Yes, Step S42 is entered; if No, Step S43 is entered. For example, according to whether generating the parity PRT in the set of parity pages of the target page group GRP_t has been completed, the memory controller 110 may determine whether to refer to the GREP table 228T or at least one P2L address mapping table to select RAID-encoded pages (e.g., the pages of RAID-encoded superpages {XP}) from the target page group GRP_t.

In Step S42, when generating the parity PRT in the set of parity pages of the target page group GRP_t has been completed, the memory controller 110 may determine the RAID-encoded pages in the target page group GRP_t according to the GREP table 228T. For example, the memory controller 110 may have updated the GRP table 228T with the associated page RAID-encoding-participation indications to correctly indicate the RAID-encoded pages in the target page group GRP_t, and therefore may identify the RAID-encoded pages among all pages of the target page group GRP_t according to the GRP table 228T.

In Step S43, when generating the parity PRT in the set of parity pages of the target page group GRP_t has not been completed, the memory controller 110 may determine the RAID-encoded pages in the target page group GRP_t according to the aforementioned at least one P2L address mapping table, and more particularly, check whether the dummy flag DUMMY_FLAG is carried by the P2L table entries corresponding to the target page group GRP_t in the aforementioned at least one P2L address mapping table, respectively, to determine the RAID-encoded pages in the target page group GRP_t. For example, if the temporary P2L address mapping table 117T has been cleared to become empty, the aforementioned at least one P2L address mapping table may comprise a backup of the temporary P2L address mapping table 117T, such as the P2L address mapping table 227T. In addition, when the temporary P2L address mapping table 117T is not empty, the aforementioned at least one P2L address mapping table may comprise the temporary P2L address mapping table 117T.

As the memory controller 110 is capable of marking one or more P2L table entries in the aforementioned at least one P2L address mapping table with the dummy flag DUMMY_FLAG for indicating that RAID encoding of at least one set of pages (e.g., the aforementioned at least one set of damaged pages and the aforementioned at least one set of dummy pages) corresponding to the one or more P2L table entries in the target page group GRP_t should be skipped, the memory controller 110 may select other sets of pages among all written pages of the target page group GRP_t, such as the sets of pages corresponding to other P2L table entries (e.g., the P2L table entries without the dummy flag DUMMY_FLAG), to be the RAID-encoded pages of the target page group GRP_t.

In Step S44, the memory controller 110 may utilize the RAID circuit 115R to decode the RAID-encoded pages of the target page group GRP_t to recover the set of erroneous pages (e.g., the erroneous superpage XP) having the UECC error in the target page group GRP_t. For example, if Step S42 has just been executed, the memory controller 110 may utilize the RAID circuit 115R to perform RAID decoding on the RAID-encoded pages except the set of erroneous pages (e.g., the erroneous superpage XP), as well as the parity PRT in the set of parity pages, to recover the set of erroneous pages. For another example, if Step S43 has just been executed, the memory controller 110 may utilize the RAID circuit 115R to perform RAID decoding on the RAID-encoded pages except the set of erroneous pages (e.g., the erroneous superpage XP), as well as the parity PRT in the RAM 116, to recover the set of erroneous pages.

For better comprehension, the RAID decoding procedure may be illustrated with the working flow shown in FIG. 8, but the present invention is not limited thereto. According to some embodiments, one or more steps may be added, deleted, or changed in the working flow shown in FIG. 8. For example, in order to obtain the determination result of Step S41, the memory controller 110 may determine whether the target page group GRP_t is within the active block 220. When the target page group GRP_t is within a certain inactive block rather than the active block 220, the memory controller 110 may determine that generating the parity PRT in the set of parity pages of the target page group GRP_t has been completed, and therefore Step S42 is entered. When the target page group GRP_t is within the active block 220, which means the superblock XB comprising the target page group GRP_t is acting as the active block 220, the memory controller 110 may determine whether the target page group GRP_t belongs to the completed page groups (e.g., the first CNT_cpg page groups, as indicated by the completed page group count CNT_cpg). If the target page group GRP_t belongs to the completed page groups, the memory controller 110 may determine that generating the parity PRT in the set of parity pages of the target page group GRP_t has been completed, and therefore Step S42 is entered; otherwise, which means the target page group GRP_t is not a completed page group, the memory controller 110 may determine that generating the parity PRT in the set of parity pages of the target page group GRP_t has not been completed, and therefore Step S43 is entered. For brevity, similar descriptions for these embodiments are not repeated in detail here.

According to some embodiments, the memory controller 110 may read the set of parity pages (e.g., the last set of pages, such as the pages of the last superpage XP) of the target page group GRP_t to determine whether the set of parity pages are blank pages, in order to determine whether generating the parity PRT in the set of parity pages has been completed. When the set of parity pages are not blank pages, the memory controller 110 may determine that generating the parity PRT in the set of parity pages of the target page group GRP_t has been completed, and therefore Step S42 is entered. When the set of parity pages are blank pages, the memory controller 110 may determine that generating the parity PRT in the set of parity pages of the target page group GRP_t has not been completed, and therefore Step S43 is entered. For brevity, similar descriptions for these embodiments are not repeated in detail here.

According to some embodiments, the memory controller 110 may utilize the RAID circuit 115R to generate or regenerate the parity PRT in the RAM 116, but the present invention is not limited thereto. In addition, the memory controller 110 may backup at least one portion (e.g., a portion or all) of the parities {PRT(0), . . . , PRT(WPC1-1)} of the current page group GRP into a certain block (e.g., the other block) in the NV memory 120, for being used in the operation of Step S44. For brevity, similar descriptions for these embodiments are not repeated in detail here.

In the embodiments shown in FIGS. 6-8, a set of pages mentioned in some steps, such as any set of pages among the last set of ECC-pass pages in Step S21, the aforementioned at least one set of damaged pages in Step S22, the aforementioned at least one set of dummy pages in Step S23, the aforementioned at least one set of first non-damaged pages and the aforementioned at least one set of second non-damaged pages in Step S26 and the set of parity pages in Step S41, may comprise multiple physical pages in a superpage XP accessed by a PPA, but the present invention is not limited thereto. According to some embodiments, when CNT_m=CNT_p=1, the multiple physical pages may be replaced with a single physical page accessed by the PPA. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing data access management of a memory device in a predetermined communications architecture to enhance sudden power off recovery (SPOR) of page-group-based redundant array of independent disks (RAID) protection with aid of multi-table control using a dummy flag, the method being applied to a memory controller of the memory device, the memory device comprising the memory controller and a non-volatile (NV) memory, the NV memory comprising at least one NV memory element, the at least one NV memory element comprising a plurality of blocks, the method comprising:

after occurrence of a sudden power off (SPO) event, utilizing the memory controller to perform a SPOR procedure in response to the SPO event, wherein the SPOR procedure comprises:
determining a beginning location of a damaged page group;
updating a temporary physical-to-logical (P2L) address mapping table corresponding to a first active block to carry the dummy flag in each P2L table entry of at least one P2L table entry corresponding to at least one set of damaged pages, for indicating that RAID encoding of the at least one set of damaged pages in the damaged page group should be skipped;
writing at least one set of dummy pages into the first active block; and
updating the temporary P2L address mapping table to carry the dummy flag in each P2L table entry of at least one P2L table entry corresponding to the at least one set of dummy pages, for indicating that RAID encoding of the at least one set of dummy pages in the damaged page group should be skipped; and
after performing the SPOR procedure in response to the SPO event, utilizing the memory controller to write subsequent data into at least one set of subsequent pages in the damaged page group.

2. The method of claim 1, wherein the SPOR procedure further comprises:
determining whether at least one set of first non-damaged pages exists in the damaged page group;
in response to existence of the at least one set of first non-damaged pages in the damaged page group, writing data of the at least one set of first non-damaged pages into the first active block to generate at least one set of second non-damaged pages, for being protected by a set of parity pages after RAID encoding of the damaged page group is completed; and
updating the temporary P2L address mapping table to generate at least one P2L table entry corresponding to the at least one set of second non-damaged pages.

3. The method of claim 2, wherein writing the data of the at least one set of first non-damaged pages into the first active block to generate the at least one set of second non-damaged pages further comprises:
backing up the data of the at least one set of first non-damaged pages into another block among the plurality of blocks to be backup data of the at least one set of first non-damaged pages; and
writing the backup data of the at least one set of first non-damaged pages into the first active block to generate the at least one set of second non-damaged pages.

4. The method of claim 1, wherein the SPOR procedure further comprises:
searching for a last set of error correction code (ECC)-pass pages in the first active block to determine a location of the at least one set of damaged pages.

5. The method of claim 4, wherein searching for the last set of ECC-pass pages in the first active block to determine the location of the at least one set of damaged pages further comprises:
reading one or more sets of pages in the damaged page group, starting from the beginning location of the damaged page group, to determine whether any uncorrectable error correction code (UECC) error occurs; and
backing up any set of ECC-pass pages having no UECC error into another block among the plurality of blocks and reading a next set of pages, until the at least one set of damaged pages having the any UECC error is found.

6. The method of claim 1, wherein the memory controller is arranged to perform multiple procedures, wherein the multiple procedures comprise the SPOR procedure and a table update procedure; and the method further comprises:

after performing the SPOR procedure in response to the SPO event, utilizing the memory controller to perform the table update procedure to manage at least one table regarding internal management of the memory device, wherein the at least one table is stored in at least one table block among the plurality of blocks, and the at least one table comprises at least one logical-to-physical (L2P) address mapping table and a group RAID-encoded page (GREP) table, wherein the table update procedure comprises:

in response to at least one predetermined criterion being met, updating multiple L2P table entries of the at least one L2P address mapping table according to multiple P2L table entries of the temporary P2L address mapping table, for indicating latest address mapping relationships; and in response to the at least one predetermined criterion being met, updating the GREP table to record multiple page RAID-encoding-participation indications of multiple sets of pages in the first active block, for indicating whether the multiple sets of pages are valid or invalid, respectively, wherein in response to existence of the dummy flag in said each P2L table entry of the at least one P2L table entry corresponding to the at least one set of damaged pages, the memory controller is arranged to record at least one first page RAID-encoding-participation indication corresponding to the at least one set of damaged pages among the multiple page RAID-encoding-participation indications to be a first predetermined RAID-encoding-participation indication for indicating that the at least one set of damaged pages are invalid.

7. The method of claim 6, wherein in response to existence of the dummy flag in said each P2L table entry of the at least one P2L table entry corresponding to the at least one set of dummy pages, the memory controller is arranged to record at least one second page RAID-encoding-participation indication corresponding to the at least one set of dummy pages among the multiple page RAID-encoding-participation indications to be the first predetermined RAID-encoding-participation indication for indicating that the at least one set of dummy pages are invalid.

8. The method of claim 6, wherein the SPOR procedure further comprises:

determining whether at least one set of first non-damaged pages exists in the damaged page group;

in response to existence of the at least one set of first non-damaged pages in the damaged page group, writing data of the at least one set of first non-damaged pages into the first active block to generate at least one set of second non-damaged pages, for being protected by a set of parity pages after RAID encoding of the damaged page group is completed; and updating the temporary P2L address mapping table to generate at least one P2L table entry corresponding to the at least one set of second non-damaged pages;

wherein in response to non-existence of the dummy flag in said each P2L table entry of the at least one P2L table entry corresponding to the at least one set of second non-damaged pages, the memory controller is arranged to record at least one other page RAID-encoding-participation indication corresponding to the at least one set of second non-damaged pages among the multiple page RAID-encoding-participation indications to be a second predetermined RAID-encoding-participation indication for indicating that the at least one set of second non-damaged pages are valid.

9. The method of claim 6, wherein a first predetermined criterion among the at least one predetermined criterion comprises a P2L table entry count of the temporary P2L address mapping table reaching a predetermined P2L table entry count.

10. The method of claim 6, wherein the at least one table further comprises a valid page count (VPC) table for recording VPCs of the plurality of blocks, and the table update procedure further comprises:

in response to the at least one predetermined criterion being met, updating the VPC table.

11. The method of claim 6, wherein in response to occurrence of an uncorrectable error correction code (UECC) error of a target page group, the memory controller is arranged to perform a RAID decoding procedure, wherein the RAID decoding procedure comprises:

determining whether generating a parity in a set of parity pages of the target page group has been completed;

according to whether generating the parity in the set of parity pages of the target page group has been completed, determining whether to refer to the GREP table or at least one P2L address mapping table to select RAID-encoded pages from the target page group; and decoding the RAID-encoded pages to recover a set of erroneous pages having the UECC error in the target page group.

12. The method of claim 11, wherein:

if generating the parity in the set of parity pages of the target page group has been completed, the memory controller is arranged to determine the RAID-encoded pages in the target page group according to the GREP table; and if generating the parity in the set of parity pages of the target page group has not been completed, the memory controller is arranged to check whether the dummy flag is carried by P2L table entries corresponding to the target page group in the at least one P2L address mapping table, respectively, to determine the RAID-encoded pages in the target page group, wherein the at least one P2L address mapping table comprises the temporary P2L address mapping table or a backup of the temporary P2L address mapping table.

13. The method of claim 1, wherein writing the at least one set of dummy pages into the first active block further comprises:

writing any set of dummy pages among the at least one set of dummy pages into the first active block and reading the any set of dummy pages to determine whether any uncorrectable error correction code (UECC) error occurs; and if the any UECC error occurs, repeating operations of writing the any set of dummy pages and reading the any set of dummy pages for a subsequent location in the damaged page group until no UECC error occurs, otherwise, preventing repeating the operations of writing the any set of dummy pages and reading the any set of dummy pages for any subsequent location in the damaged page group.

14. A memory controller of a memory device, the memory device comprising the memory controller and a non-volatile (NV) memory, the NV memory comprising at least one NV memory element, the at least one NV memory element comprising a plurality of blocks, the memory controller comprising:

a processing circuit, arranged to control the memory controller according to a plurality of host commands from a host device, to allow the host device to access the NV memory through the memory controller, wherein the processing circuit is arranged to perform data access management of the memory device in a predetermined communications architecture to enhance sudden power off recovery (SPOR) of page-group-based redundant array of independent disks (RAID) protection with aid of multi-table control using a dummy flag;

wherein:
after occurrence of a sudden power off (SPO) event, the memory controller performs a SPOR procedure in response to the SPO event, wherein the SPOR procedure comprises:
determining a beginning location of a damaged page group;
updating a temporary physical-to-logical (P2L) address mapping table corresponding to a first active block to carry the dummy flag in each P2L table entry of at least one P2L table entry corresponding to at least one set of damaged pages, for indicating that RAID encoding of the at least one set of damaged pages in the damaged page group should be skipped;
writing at least one set of dummy pages into the first active block; and
updating the temporary P2L address mapping table to carry the dummy flag in each P2L table entry of at least one P2L table entry corresponding to the at least one set of dummy pages, for indicating that RAID encoding of the at least one set of dummy pages in the damaged page group should be skipped; and
after performing the SPOR procedure in response to the SPO event, the memory controller writes subsequent data into at least one set of subsequent pages in the damaged page group.

15. The memory device comprising the memory controller of claim 14, wherein the memory device comprises:
the NV memory, configured to store information; and
the memory controller, coupled to the NV memory, configured to control operations of the memory device.

16. An electronic device comprising the memory device of claim 15, and further comprising:
the host device, coupled to the memory device, wherein the host device comprises:
at least one processor, arranged for controlling operations of the host device; and
a power supply circuit, coupled to the at least one processor, arranged for providing power to the at least one processor and the memory device;
wherein the memory device provides the host device with storage space.

* * * * *